United States Patent [19]
Botzum et al.

[11] 3,882,501
[45] May 6, 1975

[54] SYSTEM FOR DETERMINING SPEED AND HEADING OF AIRBORNE EQUIPMENT WITH RECTILINEAR COORDINATE POSITIONS

[75] Inventors: Richard Allen Botzum, Chania; Charalampos Koufidakis, Canea, Crete, both of Greece

[73] Assignee: Northrop Corporation, Los Angeles, Calif.

[22] Filed: Feb. 11, 1974

[21] Appl. No.: 441,144

[52] U.S. Cl. .......... 343/9; 235/150.26; 235/150.27; 235/151.32
[51] Int. Cl. ............................................. G01s 9/44
[58] Field of Search ........ 343/9; 235/150.2, 150.26, 235/150.27, 151.32

[56] References Cited
UNITED STATES PATENTS

| | | | |
|---|---|---|---|
| 3,181,152 | 4/1965 | Tholey | 343/9 |
| 3,217,150 | 11/1965 | Wright et al. | 235/150.27 |
| 3,337,840 | 8/1967 | Turner | 343/9 |
| 3,515,342 | 6/1970 | Brunk | 235/150.2 X |
| 3,619,579 | 11/1971 | Perkins | 343/9 X |

*Primary Examiner*—T. H. Tubbesing
*Attorney, Agent, or Firm*—Edward A. Sokolski

[57] ABSTRACT

A system for determining air speed, ground speed and direction of airborne equipment by use of the X and Y rectilinear coordinate positions for such equipment, without utilization of air speed transducers. The ground speed and direction is obtained by summing a signal representing the rate of change of the X coordinate with a signal representing the rate of change of the Y coordinate after phase shifting one of these coordinate signals with respect to the other of the coordinate signals. The air speed is obtained by summing the vector of the ground speed and direction with externally introduced information regarding wind speed and wind direction. The heading or direction of the airborne equipment is obtained by comparing the previously derived heading and direction with a reference oscillator signal in a phase detector, operating in conjunction with a closed loop servo-system.

24 Claims, 3 Drawing Figures

PATENTED MAY 6 1975 3,882,501

SHEET 1

SYSTEM FOR DETERMINING SPEED AND HEADING OF AIRBORNE EQUIPMENT WITH RECTILINEAR COORDINATE POSITIONS

BACKGROUND OF THE INVENTION

This invention relates in general to certain new and useful improvements in systems for determining air speed, ground speed, and direction of airborne equipment without resort to information from sensing transducers associated with the airborne equipment. More particularly, the invention relates to certain new and useful improvements in apparatus and methods for determining the above parameters by use of rectilinear coordinate location information regarding the airborne equipment.

In the control of various forms of airborne equipment, as for example, manned aircraft, drone aircraft, missiles, and the like, it is customary to use any of a number of forms of available tracking and plotting systems. These tracking and plotting systems are designed to provide a continual readout indicative of the range, the azimuth, and the altitude of the airborne equipment. Thus, for example, one such system which is capable of providing this form of control information is more fully described in U.S. Pat. No. 3,739,378 for a Radio Tracking System.

The aforementioned type of tracking systems normally use a tracking antenna in combination with some form of computing mechanism, such as a range and coordinate computer. This range and coordinate computer will generally generate rectilinear coordinate signals which are used to drive and operate a coordinate plotter, such as an X-Y coordinate plotter. These tracking systems have been widely used and are generally effective in determining the position or location of the airborne equipment. However, these tracking systems are not effective to provide other control information, as for example, the ground speed, the air speed, or the direction of the airborne equipment.

There have been several attempts to provide speed and direction determination systems which may be used in conjunction with the tracking antenna and the range and coordinate computer. However, these speed and direction determination systems generally rely upon complicated and expensive equipment, not only at the ground station, but also in the airborne vehicle. Furthermore, for precise control functions, these prior art type determination systems must provide comprehensive information with the necessary accuracy. Consequently, those systems which are presently available, are bulky, and of considerable weight, and in addition, are quite complex and very costly.

It has long been recognized that a need exists for a speed and direction determining apparatus which is relatively simple and which can be produced at a relatively low cost, but which is nevertheless capable of providing reasonably accurate information for purposes of control functions. In addition, it has been recognized that an apparatus of this type should be capable of being operated by relatively unskilled personnel.

It is therefore the primary object of the present invention to provide an apparatus which is capable of determining air speed, ground speed, and direction of airborne equipment without the use of air speed transducers and other forms of transducers in the airborne equipment.

It is another object of the present invention to provide an apparatus of the type stated which provides a readout of air speed, ground speed, and direction of the airborne equipment, and which can be constructed at a relatively low cost and requires little, if any, maintenance.

It is an additional object of the present invention to provide an apparatus of the type stated which is simple in its operation and which can be operated by relatively unskilled personnal.

It is another salient object of the present invention to provide a method determining air speed, ground speed, and direction of airborne equipment by the use of rectilinear coordinate location information regarding such airborne equipment.

It is also a object of the present invention to provide an apparatus of the type stated which has a higher reliability than any presently available system due to the simplicity of its design.

With the above and other objects in view, our invention resides in the novel features of form, construction, arrangement, and combination of parts presently described and pointed out in the claims.

GENERAL DESCRIPTION

The present invention relates to various embodiments of an apparatus for determining at a remote site various parameters of airborne equipment from rectilinear coordinate location information about the airborne equipment. The airborne equipment may adopt many forms including that of pilot manned aircraft, or drone aircraft, or guided missiles, or the like. Generally, the parameters which may be determined by the apparatus of the present invention are air speed, ground speed and direction of the airborne equipment. In addition the present invention provides various embodiments of a method of determining the direction and/or ground speed and/or air speed of the airborne equipment.

In general terms, the apparatus of the present invention can be described as an apparatus for determining, at a remote site, the direction and speed of airborne equipment from rectilinear coordinate location information with respect to the airborne equipment. This apparatus generally comprises input means for receiving first and second signals representative of the respective first and second rectilinear coordinates of the airborne equipment. A rate of change means is operatively associated with the input means to determine the rates of change of the first and second signals with respect to time. A phase shift means is operatively connected to the rate of change means for receiving signals representative of the rate of change of the first and second signals. This phase shift means is effective to phase shift one of the first or second signals with respect to the other of the signals. A summing means is operatively connected to the phase shift means for summing the rate of change of the first signal with respect to the rate of change of the second signal. In this way it is possible to determine the amplitude of the summed signal which is proportional to speed of the airborne equipment and the phase of the summed signal which is proportional to the direction of the airborne equipment. Speed indicative means is operatively connected to the summing means for receiving the summed signal and which speed indicative means is responsive to the amplitude of the summed signal to determine the speed of the airborne equipment. In addition, direction determination means is operatively connected to the summing means for receiving the summed signal. This direction determination means is responsive to the phase of the summed signal to determine the direction of the airborne equipment.

The apparatus for determining the direction and speed of the airborne equipment can be characterized in further detail in that the speed of the airborne equipment as determined, and as mentioned above, is the speed relative to the ground, that is the ground speed of the airborne equipment. Furthermore, rectilinear coordinates are X and Y coordinates. Consequently, the first signal is representative of the X coordinate of the airborne equipment and the second signal is representative of the Y coordinate of the airborne equipment. In addition, the first and second signals are D.C. signals which are received from an airborne equipment tracking system.

In a preferred embodiment of the apparatus for determining the direction and speed of the airborne equipment, a chopping means is operatively interposed between the rate of change means and the phase shift means. This chopping means is effective to chop the signals representative of rate of change of the first and second signals to a predetermined cycle rate.

As indicated previously, the speed of the airborne equipment as determined is the ground speed of the airborne equipment. Accordingly the apparatus further comprises wind direction resolving means to determine a vector equivalent to direction of the wind in which the airborne equipment exists. In addition, the apparatus comprises air speed determining means which is operatively connected to the direction resolving means to generate a signal, and in which the amplitude of this signal is proportional to the air speed of said airborne equipment. Furthermore, air speed indicative means is operatively connected to the air speed determining means and to the summing means. This air speed indicative means is responsive to the amplitude of this last named signal and is effective to determine the air speed of the airborne equipment from the amplitude of this signal.

The apparatus for determining the direction and speed of the airborne equipment can be further characterized in more detail in that the direction determination means also includes an airborne equipment direction resolver, as well as a phase detecting means which is operatively connected to the airborne equipment direction resolver for comparison with a reference signal. The direction determination means also comprises a reference oscillator circuit for generating and operatively introducing a reference signal to the airborne equipment direction resolver. In addition, a closed loop servosystem is operatively connected across the airborne equipment direction resolver and the phase detecting means. This closed loop servosystem will drive the airborne equipment direction resolver based on the output of the phase detecting means.

The present invention also provides a system for tracking airborne equipment and which system is capable of determining the location, speed and direction of such airborne equipment. This system comprises in general terms antenna means for detecting the presence of such airborne equipment and generating a signal representative of its presence. Coordinate computing means is operatively associated with the antenna means to generate first and second rectilinear coordinate signals representative of the location of the airborne equipment. Position indicative means is operatively connected to the coordinate computing means to determine the location of the airborne equipment. Consequently, this portion of the system is effective to determine the location of the airborne equipment.

The aforesaid tracking system also comprises speed and direction determining means which is operatively connected to the coordinate computing means and which receives the first and second rectilinear coordinate signals. A ground speed determination circuit forms part of this speed and direction determining means to determine and sum the rates of change of said first and second coordinate signals with respect to time. In this way, the ground speed determination circuit determines the ground speed of the airborne equipment. A direction determination circuit forms part of the aforesaid speed and direction determining means. This direction determination circuit is operatively connected to the speed determination circuit. Furthermore, the direction determination circuit is responsive to the phase of the summed signal, to thereby determine the direction of said airborne equipment. An air speed determination circuit also forms part of the aforesaid speed and direction determining circuit. This air speed determination circuit generates a signal in which the amplitude thereof is proportional to the air speed of the airborne equipment to thereby determine the speed of the airborne equipment.

The system for tracking airborne equipment can be characterized in further detail in that means is provided in the speed and direction determining means to externally introduce signals representative of wind direction and wind speed. These last named wind direction and wind speed representing signals are introduced into the air speed determination circuit to determine the air speed of the airborne equipment.

The speed determination circuit used in the system for tracking airborne equipment further comprises a rate of change means for determining the rates of change of the first and second coordinate signals with respect to time. A summing means is operatively connected to the rate of change means for summing the rates of change of the first and second coordinate signals. Finally, a ground speed indicative means is operatively connected to the summing means and is responsive to the amplitude of the to the summing means and is responsive to the amplitude of the summed signal to thereby determine the speed of the airborne equipment.

The above described system for the tracking of airborne equipment can also be further characterized in that the aforesaid air speed determination circuit comprises a wind direction resolving means. This wind direction resolving means is effective to determine a vector equivalent to direction of the wind in which the airborne equipment exists. Air speed determining means is also operatively connected to this wind direction resolving means to generate a signal in which the amplitude of such signal is proportional to the air speed of the airborne equipment. Air speed indicative means is operatively connected to the air speed determining means and to the summing means and which is responsive to the amplitude of the last named signal to determine the air speed of the airborne equipment.

In addition to the foregoing and in a preferred embodiment of the system for tracking airborne equipment, the direction determination circuit comprises an airborne equipment direction resolver. The direction determination circuit also comprises a phase detecting means which is operatively connected to airborne equipment direction resolver for comparison with a reference signal.

The present invention can also be described in general terms as an apparatus for determining, at a remote site, the direction, air speed and ground speed of airborne equipment from rectilinear coordinate location information concerning the airborne equipment. This apparatus will normally comprise input means for receiving first and second rectilinear coordinate signals which are representative of the respective first and second rectilinear coordinates of the airborne equipment. Rate of change-summating means is operatively connected to the aforesaid input means to determine the rate of change of the first and second signals with respect to time. This rate of change-summating means will also sum the resultant rates of change of the signals to form a summed signal. Ground speed indicative means is operatively connected to the rate of change-summating means to receive the combined signal and to determine the ground speed of the airborne equipment responsive to the amplitude of this summed signal. In this way the apparatus provides ground speed information about the airborne equipment.

The aforesaid embodiment of the apparatus will also comprise phase detecting means which is operatively connected to the rate of change-summating means. This phase detecting means is responsive to the phase of the summed signal and is operative to compare the summed signal with a reference signal. An airborne equipment direction resolving means is operatively connected to the phase detecting means and is also operable thereby to provide an indication of the direction of the airborne equipment. The apparatus also includes air speed direction resolving means which is responsive to an external wind direction condition in which the airborne equipment exists. This latter resolving means generates a signal in which the amplitude thereof is proportional to the air speed of the airborne equipment. Finally, the apparatus includes air speed indicative means which is operatively connected to the above mentioned air speed direction resolving means. This air speed indicative means will thereupon determine the air speed of the airborne equipment responsive to the amplitude of this last named signal.

The apparatus for determining, at a remote site, the direction, air speed and ground speed of airborne equipment can also be characterized in further detail in that the rate of change-summating means comprises an individual rate of change means and an individual summing means. The rate of change means is operatively connected to the input means to determine the rate of change of the first and second signals with respect to time. The individual summing means is connected to the output of the rate of change means for summing the rate of change of the first signal with respect to the rate of change of the second signal. In addition, phase shift means is operatively interposed between the rate of change means and the summing means to phase shift one of the first or second signals with respect to the other of said first and second signals.

In a preferred embodiment of the aforesaid apparatus for determining, the direction, air speed and ground speed of the airborne equipment, the rectilinear coordinates are X and Y coordinates. Consequently, the first signal is representative of the X coordinate of the airborne equipment and the second signal is representative of the Y coordinate of the airborne equipment. In addition, the first and second signals are D.C. signals and are received from an airborne equipment tracking system.

Also, in a preferred aspect of this latter embodiment of the apparatus, a reference oscillator circuit is operatively associated with the airborne equipment direction resolving means and said phase detecting means. In this way, the reference oscillator circuit generates and introduces a reference signal to the airborne equipment direction resolving means. In addition, a closed loop servo-system is operatively connected across the airborne equipment direction resolving means and the phase detecting means. Thus, the servo-system will drive the airborne equipment direction resolving means based on the output of the phase detecting means. Furthermore, means is provided for the air speed direction resolving means to externally introduce signals representative of wind direction and wind speeds. These last named wind direction and wind speed signals are effective to aid in the determination of air speed of the airborne equipment.

The present invention also provides a method for determining, at a remote site, the direction and speed of airborne equipment from rectilinear coordinate location information. The method of the present invention in this embodiment comprises the receiving of first and second signals representative of the respective first and second rectilinear coordinates of the airborne equipment. The rates of change of the first and second signals are then determined with respect to time. One of the first and second signals is phase shifted with respect to the other of the signals after determining the rate of change of the first and second signals. The rate of change of the first signal is then summed with respect to the rate of change of the second signal. The amplitude of the summed signal is next determined, inasmuch as the amplitude of the signal is proportional to speed of the airborne equipment. The phase of the summed signal, which is proportional to the direction of the airborne equipment, is then determined. The method thereafter includes the determining of the speed of the airborne equipment in response to the amplitude of the summed signal. Finally, the direction of the airborne equipment is then determined in response to the phase of the summed signal.

The method for determining the direction and speed of the airborne equipment can be characterized in further detail in that the speed of the airborne equipment, as determined, is the speed relative to the ground, i.e. the ground speed. The rectilinear coordinates are X and Y coordinates so that the first signal is representative of the X coordinate of the airborne equipment and the second signal is representative of the Y coordinate of the airborne equipment. The first and second signals are in the form of D.C. signals which are transmitted from an airborne equipment tracking system.

The method for determining the direction and speed of the airborne equipment can also be further characterized in that the signals representative of rate of change of the first and second signals are chopped to a predetermined cycle rate. The method also includes comparing the summed signal with a reference signal and operating an airborne equipment direction resolver thereby through a closed loop servo-system.

In another embodiment of the method of the present invention for tracking airborne equipment and determining the position, speed and direction of such airborne equipment, the method can be described as a method which comprises the detecting of the presence of such airborne equipment. Thereafter, a signal is generated representative of the presence of such airborne equipment. First and second rectilinear coordinate signals are generated and which are representative of the location of said airborne equipment. The location of said airborne equipment is then determined based on the coordinate signals. In addition, the method includes the determining of the rates of change of the first and second rectilinear coordinate signals. The rates of change of the first and second coordinate signals are then summed with respect to time, to thereby produce a summed signal. Finally, the ground speed of the airborne equipment is then determined based on the amplitude of this summed signal. Thereafter, the direction of said airborne equipment is determined in response to the phase of the summed signal. In order to determine the air speed of the airborne equipment, a signal is generated in which the amplitude thereof is proportional to the air speed of the airborne equipment. In this way, it is possible to determine the air speed of the airborne equipment from said last named signal.

This method for the tracking of airborne equipment can be characterized in further detail in that the method comprises externally introducing signals representative of wind direction and wind speed. These last named signals are introduced for the purpose of determining the air speed of the airborne equipment. The ground speed of the airborne equipment is determined in response to the amplitude of the summed signal.

In another embodiment of the method of the present invention, the method relates to the determining, at a remote site, the direction, air speed and ground speed of airborne equipment from rectilinear coordinate location information about the airborne equipment. This method comprises the receiving of first and second rectilinear coordinate signals which are representative of the first and second rectilinear coordinates, respectively, of the airborne equipment. The rate of change of the first and second signals is then determined with respect to time. The resultant rate of changes of the signals is next summed to form a summed signal. From this summed signal, the ground speed of the airborne equipment is determined in response to the amplitude of the summed signal. The phase of the summed signal is detected and the phase of the summed signal is then compared with a reference signal. Indication of the direction of the airborne equipment is provided based on the phase of the summed signal and comparison with the reference signal. A signal in which the amplitude thereof is proportional to the air speed of the airborne equipment is next generated. The air speed of the airborne equipment is also responsive to external wind direction condition in which the airborne equipment exists. Finally, the air speed of the airborne equipment is determined in response to the amplitude of this last named signal.

The method for determining at a remote site, the direction, air speed and ground speed of the aforesaid airborne equipment can be characterized in further detail in that the rectilinear coordinates are again X and Y coordinates. Thus, the first signal is representative of the X coordinate of the airborne equipment and the second signal is representative of the Y coordinate of the airborne equipment. Furthermore, the first and second signals are D.C. signals which are received from an airborne equipment tracking system.

The method for determining, at a remote site, the direction, air speed and ground speed of airborne equipment can also be further characterized in that the method comprises the externally introducing signals representative of wind direction and wind speed. These last named wind direction and wind speed signals, as indicated above, are effective to aid in the determination of air speed of the airborne equipment.

More specifically, the X and Y rectilinear coordinate DC voltages from any tracking system can be fed into a rectilinear plotting board and the position or location of the target can be displayed. These same X and Y rectilinear coordinate DC voltages can be used to obtain the target ground speed and target heading. From this ground speed it is also possible to obtain the air speed.

Target location is represented by:
$P = \sqrt{X^2 + Y^2}$,
then the rate of P can be obtained by:
$dP/dt = \sqrt{(dX/dt)^2 + (dY/dt)^2}$
where
$dP/dt$ is the target ground speed,
$dX/dt$ is the rate of change of the X coordinate,
$dY/dt$ is the rate of change of the Y coordinate.

Determination of ground speed, air speed and target heading and direction is discussed individually below.

GROUND SPEED

Rectilinear coordinate DC voltages X and Y are introduced into input and rate of change circuits which generate outputs in the form of DC voltages proportional to the rate of change of X and Y or $dX/dt$ and $dY/dt$. These voltages are then amplified and the outputs are then chopped at a 400 cycle rate. At this point the $dX/dt$ and the $dY/dt$ DC voltages have been converted to $dX/dt$ and $dY/dt$ 400Hz AC voltages having amplitudes proportional to the $dX/dt$ and $dY/dt$ DC voltages. Furthermore, at this point the $dX/dt$ and $dY/dt$ voltages are 180° out of phase. These two chopped DC voltages are amplified and converted to pure sine waves in 400Hz band pass filters. The $dY/dt$ output from one band pass filter is phase shifted 90° so that the two outputs have a phase difference of 90°. These two outputs are summed in a summing amplifier and the output of the summing amplifier is a 400Hz voltage with an amplitude proportional to the ground speed of the target and with a phase equivalent to the target heading. A meter indicating the target ground speed is operated by a rectified output of the summing amplifier.

AIR SPEED

The target air speed is the sum of the vectors of target ground speed and target direction, as well as wind speed and wind direction. A vector equivalent to wind direction is established by activating a wind direction resolver with a reference 400Hz signal from a reference oscillator circuit. By manually rotating the wind direction resolver, the phase of its output is changed with respect to the reference oscillator signal, and therefore, the wind direction is established by means of the wind direction resolver. The output from the wind direction resolver is introduced to an air speed amplifier with a manually adjustable gain to provide a signal output which is proportional to wind speed. The wind speed is the readout on meter connected to this last named amplifier. The wind direction adjustments are set on a 0° to 360° marked dial attached to the rotor of resolver. The meterological data required for setting the wind speed and direction controls may be obtained from local meterological centers as aforesaid.

As indicated above, the output from the summing amplifier is a 400Hz signal with an amplitude which is proportional to target ground speed and a phase which is equivalent to the target heading. The output of the air speed amplifier is a 400 Hz signal with an amplitude proportional to wind speed and a phase equivalent to wind direction. These two signals, namely the summing amplifier output and the air speed amplifier output, are then summed in a further summing amplifier. The output of the last named amplifier is the target air speed. A meter connected to the output of this last named summing amplifier displays the rectified output which is the target air speed.

TARGET HEADING

Inasmuch as the output of the original summing amplifier is a 400Hz signal with a phase equivalent to target heading, this output is introduced through an amplifier to a phase detector. In addition, the 400Hz signal from the reference oscillator is introduced into the reference input of the phase detector. The output from the phase detector energizes a servo motor thru a servo amplifier. The servo motor rotates the rotor of a target heading resolver to null out any phase error. On the rotor of the heading resolver is a pointer that rotates around the face of a 0° to 360° dial face. The position of this pointer thereupon delineates target heading.

BRIEF DESCRIPTION OF THE DRAWINGS

Figure 1:
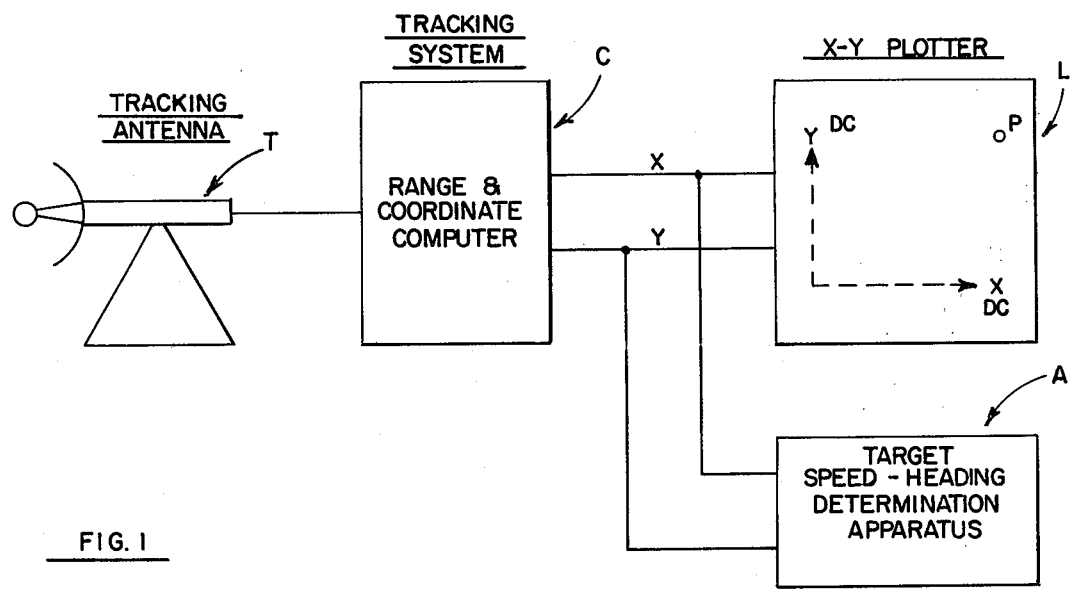
Figure 2:
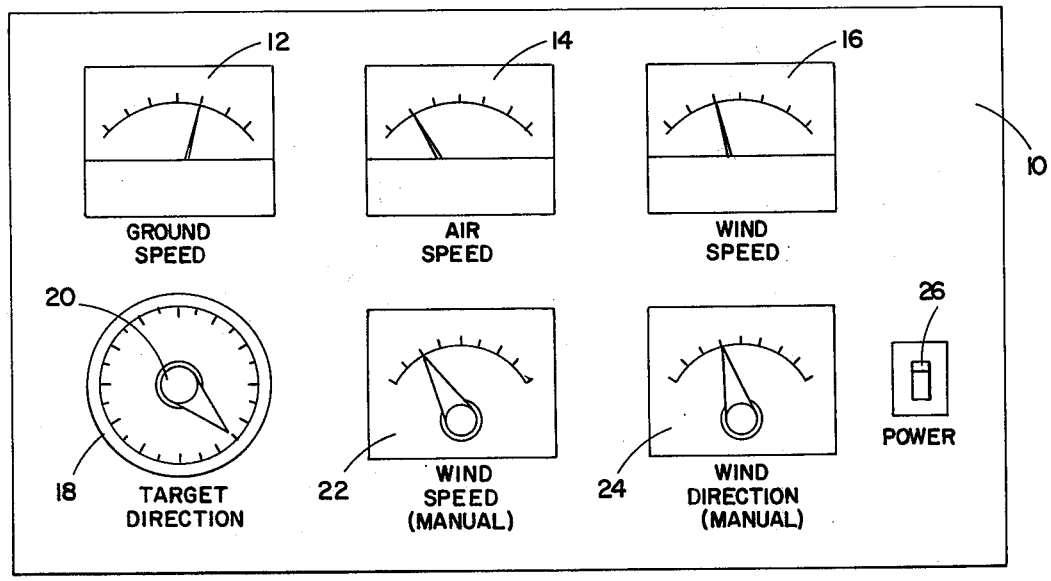
Figure 3:
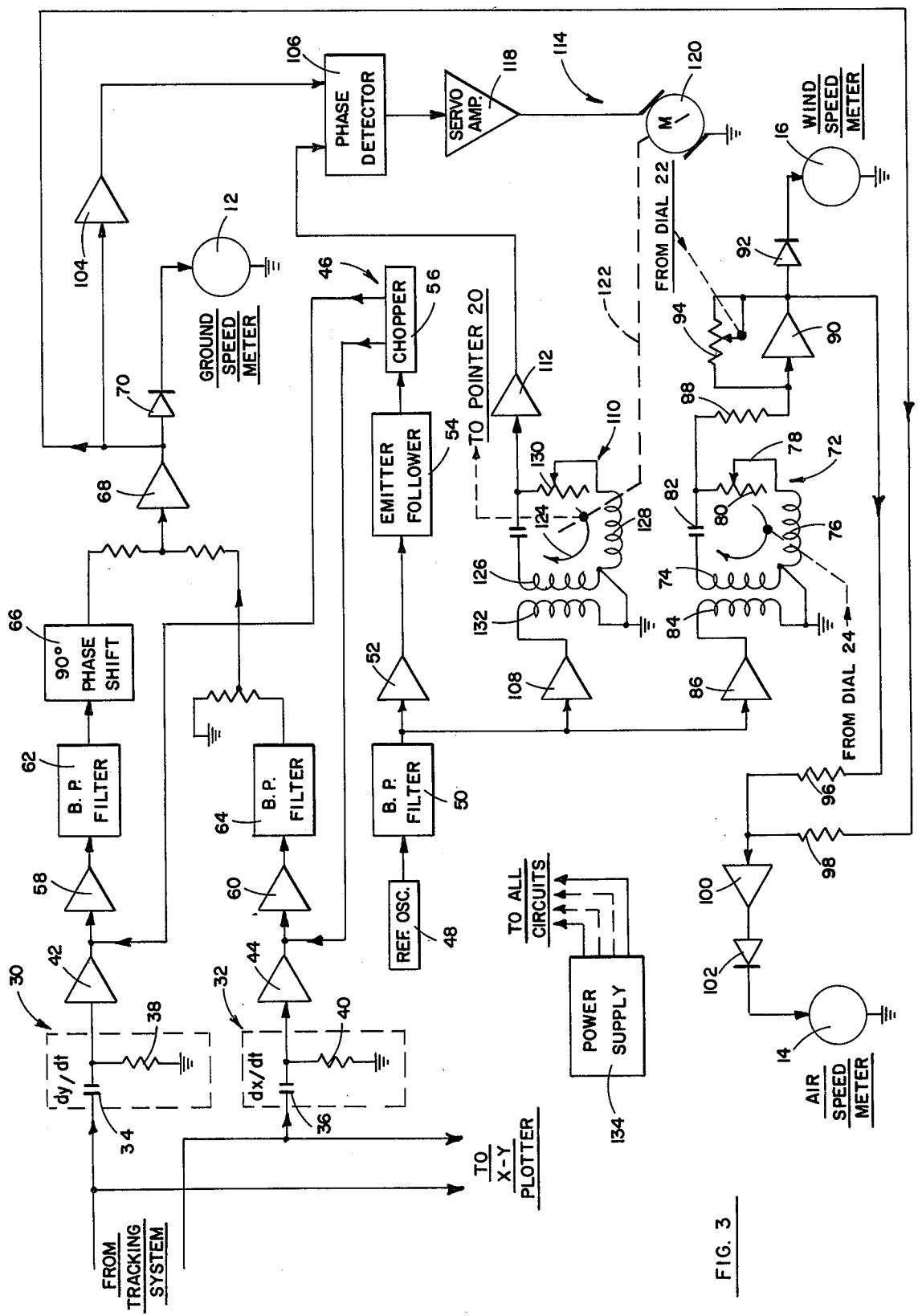

Having thus described the invention in general terms, reference will now be made to the accompanying drawings in which:

FIG. 1 is a functional schematic view illustrating the general components of a ranging and tracking system which utilizes the target speed-heading determination apparatus of the present invention for determining target speed and direction;

FIG. 2 is a front elevational view of a control panel forming part of the target speed-heading determination apparatus constructed in accordance with and embodying the present invention; and FIG. 3 is a functional schematic view of the electrical circuitry illustrating a preferred embodiment of the target speed-heading determination apparatus of the present invention.

DETAILED DESCRIPTION

Referring now in more detail and by reference characters to the drawings which illustrate a preferred embodiment of the present invention, A designates a speed-heading determination apparatus which is used with an airborne equipment tracking system, more fully illustrated in FIG. 1 of the drawings. It can be observed that the tracking system includes a tracking antenna T which detects the presence of airborne equipment and generates a signal in response thereto for delivery to a range and coordinate computer C. Normally, an X-Y plotter L would receive X and Y coordinate signals or other forms of rectilinear coordinate signals from the range and coordinate computer C for plotting the position or location of the airborne equipment.

As used herein, the term "airborne equipment", is often referred to as a "target", and would include manned aircraft, drone aircraft, guided or unguided missiles, and the like. Thus, for example, the target speed-heading determination apparatus A could be used with a tracking system of the type which is more fully illustrated and described in the aforementioned U.S. Pat. No. 3,739,378. The X and Y rectilinear coordinate signals are essentially D.C. voltages as generated by the range and coordinate computer C. These coordinate signals which are used to operate the X-Y plotter L can also be used in obtaining the target ground speed, the target direction and the target air speed, in a manner hereinafter specified in more detail.

The term "target heading" is often used synonymously with the term "target direction". Furthermore, the X-Y plane would normally be a horizontal plane with the X axis perpendicular to the Y axis. In this case the X coordinate represents the east-west direction and the Y coordinate represents the north-south direction. In this respect, while the present invention is operable with the X and Y rectilinear coordinates, it should be obvious that any other form of rectilinear coordinates could be used.

The target speed-heading determination apparatus A is more fully illustrated in FIGS. 2 and 3 of the drawings, and would conventionally be mounted within an outer housing (not shown). This outer housing would be provided with a front face panel, or so-called "control panel" 10 as more fully illustrated in FIG. 2 of the drawings. Furthermore, the apparatus A can be located in proximity to or remote from the tracking system. In addition, the apparatus A is operable with any form of coordinate signals and in this respect, this form of tracking system as illustrated and described herein is not necessary.

By further reference to FIG. 2, it can be observed that the control panel 10 would include a ground speed meter 12, an air speed meter 14, and a wind speed meter 16. In addition, the control panel 10 would include a target direction readout dial 18, which is operable by the apparatus A, in such manner that a pointer 20 on the readout dial 18 would be automatically rotated to a number or other indicia representative of the target direction. The control panel would also be provided with a manually rotatable wind speed dial 22 and a manually rotatable wind direction dial 24.

The wind speed and wind direction data would be determined from local meterological stations, or the like, and would be manually introduced into the apparatus A by actuation of the various dials 22 and 24. Finally, the control panel would include a main power switch 26. The various dials and meters would be provided with indicia representative of the data to be presented. Thus, for example, wind speed and air and ground speed would be presented in miles per hour or equivalent indicia.

The target position or location, as displayed by the X-Y plotter P, can be obtained by the equation $P = \sqrt{X^2 + Y^2}$. Accordingly, the rate of change of the location L can be obtained by the equation:

$(dP/dt) = \sqrt{(dX/dt)^2 + (dY/dt)^2}$ where

1. $dP/dt$ is the target ground speed,
2. $dX/dt$ is the rate of change of the X coordinate, and 3. $dY/dt$ is the rate of change of the Y coordinate. From this information, it is then possible to obtain the actual target ground speed, the target air speed, and the actual target direction. These determinations are more fully performed by the circuitry, as illustrated in FIG. 3 of the drawings.

Rectilinear coordinate voltages in the form of D.C. voltages representing the X and Y coordinates are introduced over input lines from the tracking system into input circuits 30 and 32 respectively. Each of the circuits 30 and 32 comprise capacitors 34 and 36, the output sides of which are grounded through resistors 38 and 40, respectively. These input circuits 30 and 32 are generally differentiating circuits so that the circuit 30 generates a D.C. voltage which is representative of the rate of change of the Y coordinate with respect to time, and the circut 32 generates a D.C. voltage which is representative of the rate of change of the X coordinate with respect to time. The $dY/dt$ and the $dX/dt$ signals are respectively introduced into and are amplified by D.C. amplifiers 42 and 44.

The outputs of the amplifiers 42 and 44 are then chopped at a four hundred cycle rate by means of inputs from a chopping circuit 46. This chopping circuit 46 includes a reference frequency oscillator 48 which provides a reference oscillator signal, and which is introduced into a 400Hz band pass filter 50. The output of the band pass filter 50 is amplified by means of an amplifier 52 and this amplified and filtered reference oscillator signal is then introduced into an emitter follower circuit 54 and ultimately to a 400Hz chopper 56. The outputs of the chopper 56 are introduced to the outputs of the amplifier 42 and 44 as aforesaid.

After the coordinate signals have been chopped at the outputs of the amplifiers 42 and 44, the D.C. voltages are converted to $dY/dt$ and $dX/dt$ voltages at a 400Hz cycle rate, and which have amplitudes proportional to the $dY/dt$ and the $dX/dt$ D.C. voltages. However, at this point, the signals are 180° out of phase. These chopped D.C. voltages are then amplified in amplifiers 58 and 60 and then introduced into 400Hz band pass filters 62 and 64 respectively where the signals are converted to pure sine wave signals. The output of the band pass filter 62 is then introduced into a phase shift circuit 66 so that the $dY/dt$ signal is shifted 90°. Consequently, at this point, the $dY/dt$ signal and the $dX/dt$ signals have a phase difference of 90°.

The output of the band pass filter 64 and the output of the phase shift circuit 66 are introduced into a summing amplifier 68 in order to obtain a 400Hz voltage with an amplitude proportional to the ground speed of the target and with a phase equivalent to the target heading or target direction. The output of the amplifier 68 is then passed through a rectifying diode 70 and into the ground speed meter 12 which is responsive to the amplitude of the summed signal. Consequently, the ground speed meter is effective to provide a readout of the actual ground speed of the airborne equipment.

The air speed determination is made by summing the vectors of the target ground speed and direction as previously determined, as well as the wind speed and wind direction. For this purpose, the apparatus A comprises a wind direction resolver 72 which is operatively connected to and actuable by the manually operable wind direction dial 24 on the control panel 10. The wind direction resolver 72 comprises a pair of coils 74 and 76 connected in common, the latter coil 76 having one end connected to a center tap 78 across a resistor 80. The opposite end of the coil 74 and the resistor 80 are connected through a capacitor 82. The coil 74 is disposed in voltage exchange relationship with a secondary coil 84 receiving an output from an amplifier 86, and which, in turn, receives a reference oscillator signal input from the band pass filter 50. By manually rotating the wind direction dial 24, the rotor of the resolver 72 is rotated and hence the phase of its output is changed with respect to the reference oscillator signal generated from the reference oscillator 48.

One side of the capacitor 82 is connected through a resistor 88 to an amplifier 90, and the output of the amplifier 90 is connected through a rectifier diode 92 to the wind speed meter 16. Connected across the amplifier 90 in feedback relationship thereto is a potentiometer 94 which is actuatable by the wind speed dial 22 in order to introduce the external wind conditions in which the airborne equipment exists. As indicated, the wind speed which is introduced by the actuation of the dial 22 and hence the potentiometer 94 is then displayed on the wind speed meter 16.

The output of the amplifier 90 is also introduced through an input resister 96, and the output of the summing amplifier 68 is introduced through an input resistor 98 into a summing amplifier 100. The output of the amplifier 100 is, in turn, passed through a rectifying diode 102 and into the air speed meter 14. As indicated previously, the wind direction in which the airborne equipment exists is established by the resolver 72. The amplifier 90 has a gain which is adjustable by means of the potentiometer 94 and therefore the amplifier 94 provides an output which is proportional to wind speed.

As indicated previously, meterological data is required for setting the wind speed and wind direction controls, and may be obtained from local meteorological centers. The output from the summing amplifier 68 is a 400Hz signal with an amplitude proportional to target ground speed and a phase equivalent to target heading, as indicated above. Furthermore, the output of the amplifier 90 is a 400Hz signal with an amplitude proportional to wind speed and a phase equivalent to wind direction. Consequently, when these two signals are summed in the summing amplifier 100, the output of this amplifier 100 is representative of target air speed, and the meter 14 displays this rectified output of target speed.

As also indicated previously, the output of the amplifier 68 is a 400Hz signal with a phase (with respect to the 400Hz reference oscillator signal) equivalent to the target heading or direction. This output from the amplifier 68 is introduced into an amplifier 104 where the signal is amplified and introduced into a 400Hz phase detector 106. A reference oscillating signal from the reference oscillator 48 is also introduced through an amplifier 108, a heading resolver or aircraft equipment direction resolver 110 (to be hereinafter described), through a second A.C. amplifier 112 and into the phase detector 106.

The output of the phase detector 106 energizes a servo-system 114 including a servo amplifier 118 which operates a servo motor 120. The servo motor 120 is provided with an output shaft, schematically designated as 122 which, in turn, is connected to and drives the rotatable element or rotor 124 of the aircraft equipment direction resolver 110. Furthermore, the rotatable element 124 of this aircraft direction resolver is connected to the pointer 20 on the target direction dial 18 for driving the pointer 20.

The airborne equipment heading resolver 110 also comprises a pair of commonly connected coils 126 and 128, the latter being connected to a center tap across a resistor 130, in the manner as schematically illustrated in FIG. 3. The coil 126 operates in conjunction with a secondary coil 132, the latter being connected to the output of the amplifier 108, also in the manner as illustrated in FIG. 3.

In essence, the servo motor 120 rotates the rotor 124 of the direction resolver 110, and, in effect, will null out any phase error. The dial 18 has a dial face with indicia of 0° to 360°. Consequently, rotation of the pointer 20 in response to movement of the rotor 124 will delineate the target heading. It can be observed that the phase detector which receives the output of the amplifier 68 and which forms part of the direction determination means, is responsive to the phase of the X and Y coordinate signals. The phase responsive output of the phase detector 106, in turn, drives the servo motor in response to the phase of this signal and which, in turn, operates the heading resolver 110 in order to provide a readout on the target direction dial 18.

A power supply 134 which is essentially conventional in its construction is also provided in the apparatus A, and provides power outputs to all circuits which require a source of electrical power. Generally, the power supply would be capable of providing a positive 15 volt D.C. output, a negative 15 volt D.C. output, and a positive 20 volt D.C. output. The output lines from the power supply 134 are not connected to the various components in order to maintain clarity and simplicity in the drawings. However, it would be obvious to the skilled artisan to connect the power supply as required.

Thus, there has been illustrated and described a novel apparatus and method for determining the ground speed, air speed and direction of airborne equipment, and which fulfills all of the objects and advantages sought therefore. Many changes, modifications, variations and other uses and applications of the aforesaid apparatus and method will become apparent to those skilled in the art after considering this specification and the accompanying drawings. All such changes, modifications, variations and other uses and applications which do not depart from the spirit and scope of the invention are deemed to be covered by the invention which is limited only by the following claims.

Having thus described our invention, what we desire to claim and secure by letters patent is:

1. Apparatus for determining at a remote site the direction and speed of airborne equipment from rectilinear coordinate location information, said apparatus comprising:
   a. input means for receiving first and second signals representative of the respective first and second rectilinear coordinates of the airborne equipment,
   b. rate of change means operatively associated with said input means to determine the rates of change of said first and second signals with respect to time,
   c. phase shift means operatively connected to said rate of change means for receiving signals representative of the rate of change of said first and second signals and phase shifting one of the first and second signals with respect to the other of said signals,
   d. summing means operatively connected to said phase shift means for summing the rate of change of the first signal with respect to the rate of change of the second signal, to determine the amplitude of the summed signal which is proportional to speed of the airborne equipment and the phase of the summed signal which is proportional to the direction of the airborne equipment,
   e. speed indicative means operatively connected to said summing means for receiving the summed signal and which speed indicative means is responsive to the amplitude of the summed signal to determine the speed of the airborne equipment, and
   f. direction determination means operatively connected to said summing means for receiving the summed signal and which direction determination means is responsive to the phase of the summed signal to determine the direction of the airborne equipment.

2. The apparatus for determining the direction and speed of the airborne equipment of claim 1 further characterized in that chopping means is operatively interposed between said rate of change means and said phase shift means to chop the signals representative of rate of change of the first and second signals to a predetermined cycle rate.

3. The apparatus for determining the direction and speed of the airborne equipment of claim 1 further characterized in that the speed of the airborne equipment as determined is the ground speed of the airborne equipment, said apparatus further comprising wind direction resolving means to determine a vector equivalent to direction of the wind in which the airborne equipment exists, air speed determining means operatively connected to said direction resolving means to generate a signal in which the amplitude is proportional to the air speed of said airborne equipment, and air speed indicative means operatively connected to said air speed determining means and to said summing means and which is responsive to the amplitude of said last named signal to determine the air speed of the airborne equipment.

4. The apparatus for determining the direction and speed of the airborne equipment of claim 1 further characterized in that said direction determination means comprises an airborne equipment direction resolver and a phase detecting means operatively connected to said airborne equipment direction resolver for comparison with a reference signal.

5. The apparatus for determining the direction and speed of the airborne equipment of claim 4 further characterized in that said direction determination means also comprises a reference oscillator circuit for generating and operatively introducing a reference signal to said airborne equipment direction resolver.

6. The apparatus for determining the direction and speed of the airborne equipment of claim 4 further characterized in that said direction determination means comprises a closed loop servosystem which is operatively connected across said airborne equipment direction resolver and phase detecting means to drive the airborne equipment direction resolver based on the output of said phase detecting means.

7. A system for tracking airborne equipment and determining the location, speed and direction of such airborne equipment, said system comprising:

a. antenna means detecting the presence of such airborne equipment and generating a signal representative of its presence, b. coordinate computing means operatively associated with said antenna means to generate first and second rectilinear coordinate signals representative of the location of said airborne equipment, c. position indicative means operatively connected to said coordinate computing means to determine the location of said airborne equipment, d. speed and direction determining means operatively connected to said coordinate computing means and receiving the first and second rectilinear coordinate signals, e. a ground speed determination circuit forming part of said speed and direction determining means to determine and sum the rates of change of said first and second coordinate signals with respect to time and thereby determine the ground speed of the airborne equipment, f. a direction determination circuit forming part of said speed and direction determining means and being operatively connected to said speed determination circuit, and being responsive to the phase of the summed signal to thereby determine the direction of said airborne equipment, and g. an air speed determination circuit forming part of said speed and direction determining circuit for generating a signal in which the amplitude thereof is proportional to the air speed of the airborne equipment and thereby determine the speed of the airborne equipment.

8. The system for tracking airborne equipment of claim 7 further characterized in that means is provided in said speed and direction determining means to externally introduce signals representative of wind direction and wind speed, and which last named signals are introduced into said air speed determination circuit to determine air speed of the airborne equipment.

9. The system for tracking airborne equipment of claim 7 further characterized in that said ground speed determination circuit comprises:

a. rate of change means for determining the rates of change of said first and second coordinate signals with respect to time, b. summing means operatively connected to said rate of change means for summing the rates of change of the first and second coordinate signals, and c. ground speed indicative means operatively connected to said summing means and being responsive to the amplitude of the summed signal to thereby determine the speed of the airborne equipment.

10. The system for tracking airborne equipment of claim 7 further characterized in that said air speed determination circuit comprises:

a. direction resolving means to determine a vector equivalent to direction of the wind in which the airborne equipment exists, b. air speed determining means operatively connected to said direction resolving means to generate a signal in which the amplitude is proportional to the air speed of said airborne equipment, c. and air speed indicative means operatively connected to said air speed determining means and which is responsive to the amplitude of said last named signal to determine the air speed of the airborne equipment.

11. The system for tracking airborne equipment of claim 7 further characterized in that said direction determination circuit comprises an airborne equipment direction resolver and a phase detecting means operatively connected to said airborne equipment direction resolver for comparison with a reference signal.

12. Apparatus for determining at a remote site the direction, air speed and ground speed of airborne equipment from rectilinear coordinate location information, said apparatus comprising:

a. input means for receiving first and second rectilinear coordinate signals representative of the respective first and second rectilinear coordinates of the airborne equipment, b. rate of change-summing means operatively connected to said input means to determine the rate of change of the first and second signals with respect to time and to sum the resultant rate of changes of the signals to form a summed signal, c. ground speed indicative means operatively connected to said last named means to receive the combined signal and determine the ground speed of the airborne equipment responsive to the amplitude of the summed signal, d. phase detecting means operatively connected to said rate of change-summing means and being responsive to the phase of the summed signal and comparing the summed signal with a reference signal, e. airborne equipment direction resolving means operatively connected to said phase detecting means and being operable thereby to provide indication of the direction of the airborne equipment, f. air speed direction resolving means responsive to external wind direction conditions in which the airborne equipment exists and generating a signal in which the amplitude thereof is proportional to the air speed of the airborne equipment and, g. air speed indicative means operatively connected to said air speed direction resolving means and determining the air speed of the airborne equipment responsive to the amplitude of said last named signal.

13. The apparatus for determining at a remote site the direction, air speed and ground speed of airborne equipment of claim 12 further characterized in that said rate of change-summing means comprises a rate of change means operatively connected to the input means to determine the rate of change of the first and second signals with respect to time, and a summing means for summing the rate of change of the first signal with respect to the rate of change of the second signal, and phase shift means operatively interposed between said rate of change means and said summing means to phase shift one of the first or second signals with respect to the other of said first and second signals.

14. The apparatus for determining at a remote site the direction, air speed and ground speed of airborne equipment of claim 12 further characterized in that a reference oscillator circuit is operatively associated with said airborne equipment direction resolving means and said phase detecting means for generating and introducing a reference signal to said airborne equipment direction resolving means.

15. The apparatus for determining at a remote site the direction, air speed and ground speed of airborne equipment of claim 12 further characterized in that a closed loop servosystem is operatively connected across said airborne equipment direction resolving means and said phase detecting means to drive the airborne equipment direction resolving means based on the output of said phase detecting means.

16. The apparatus for determining at a remote site the direction air speed and ground speed of airborne equipment of claim 12 further characterized in that means is provided for said air speed direction resolving means to externally introduce signals representative of wind direction and wind speed and which last named signals are effective to aid in the determination of air speed of the airborne equipment.

17. A method for determining at a remote site the direction and speed of airborne equipment from rectilinear coordinate location information, said method comprising:
  a. receiving first and second signals representative of the respective first and second rectilinear coordinates of the airborne equipment,
  b. determining the rates of change of said first second signals with respect to time,
  c. phase shifting one of the first and second signals with respect to the other of said signals after determining the rate of change of said first and second signals,
  d. summing the rate of change of the first signal with respect to the rate of change of the second signal,
  e. determining the amplitude of the summed signal which is proportional to speed of the airborne equipment,
  f. determining the phase of the summed signal which is proportional to the direction of the airborne equipment,
  g. determining the speed of the airborne equipment in response to the amplitude of the summed signal, and
  h. determining the direction of the airborne equipment in response to the phase of the summed signal.

18. The method for determining the direction and speed of the airborne equipment of claim 17 further characterized in that the signals representative of rate of change of the first and second signals are chopped to a predetermined cycle rate.

19. The method for determining the direction and speed of the airborne equipment of claim 17 further characterized in that the method includes comparing the summed signal with a reference signal and operating an airborne equipment direction resolver thereby through a closed loop servosystem.

20. A method for tracking airborne equipment and determining the position, speed and direction of such airborne equipment, said method comprising:
  a. detecting the presence of such airborne equipment,
  b. generating a signal representative of the presence of such airborne equipment,
  c. generating first and second rectilinear coordinate signals representative of the location of said airborne equipment,
  d. determining the location of said airborne equipment based on said coordinate signals,
  e. determining the rates of change of the first and second rectilinear coordinate signals,
  f. summing the rates of change of said first and second coordinate signals with respect to time to produce a summed signal and thereby determine the ground speed of the airborne equipment,
  g. determining the direction of said airborne equipment responsive to the phase of the summed signal, and
  h. generating a signal in which the amplitude thereof is proportional to the air speed of the airborne equipment, and
  i. determining the speed of the airborne equipment from said last named signal.

21. The method for tracking airborne equipment of claim 20 further characterized in that the method comprises externally introducing signals representative of wind direction and wind speed, and which last named signals are introduced to determine air speed of the airborne equipment.

22. The method for tracking airborne equipment of claim 20 further characterized in that said method comprises determining the speed of the airborne equipment responsive to the amplitude of the summed signal.

23. A method for determining at a remote site the direction, air speed and ground speed of airborne equipment from rectilinear coordinate location information, said method comprising:
  a. receiving first and second rectilinear coordinate signals representative of the respective first and second rectilinear coordinates of the airborne equipment,
  b. determining the rate of change of the first and second signals with respect to time,
  c. summing the resultant rate of changes of the signals to form a summed signal,
  d. determining the ground speed of the airborne equipment responsive to the amplitude of the summed signal,
  e. detecting the phase of the summed signal,
  f. comparing the phase of the summed signal with a reference signal,
  g. providing indication of the direction of the airborne equipment based on the phase of the summed signal and comparison with the reference signal,
  h. generating a signal in which the amplitude thereof is proportional to the air speed of the airborne equipment and which is also responsive to external wind direction conditions in which the airborne equipment exists, and
  i. determining the air speed of the airborne equipment responsive to the amplitude of said last named signal.

24. The method for determining at a remote site the direction, air speed and ground speed of airborne equipment of claim 23 further characterized in that the method comprises externally introducing signals representative of wind direction and wind speed and which last named signals are effective to aid in the determination of air speed of the airborne equipment.

* * * * *